United States Patent Office 3,339,910
Patented Sept. 5, 1967

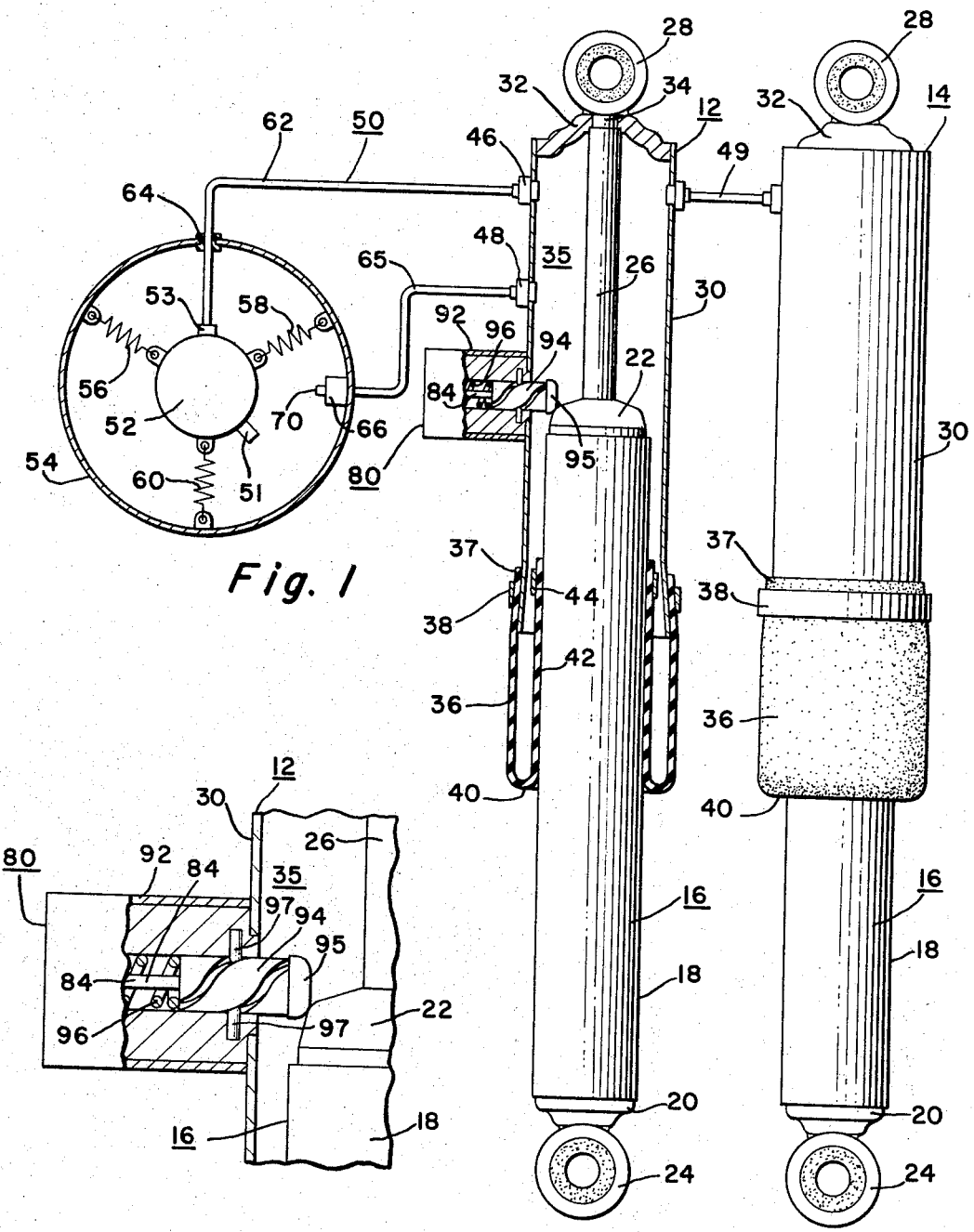

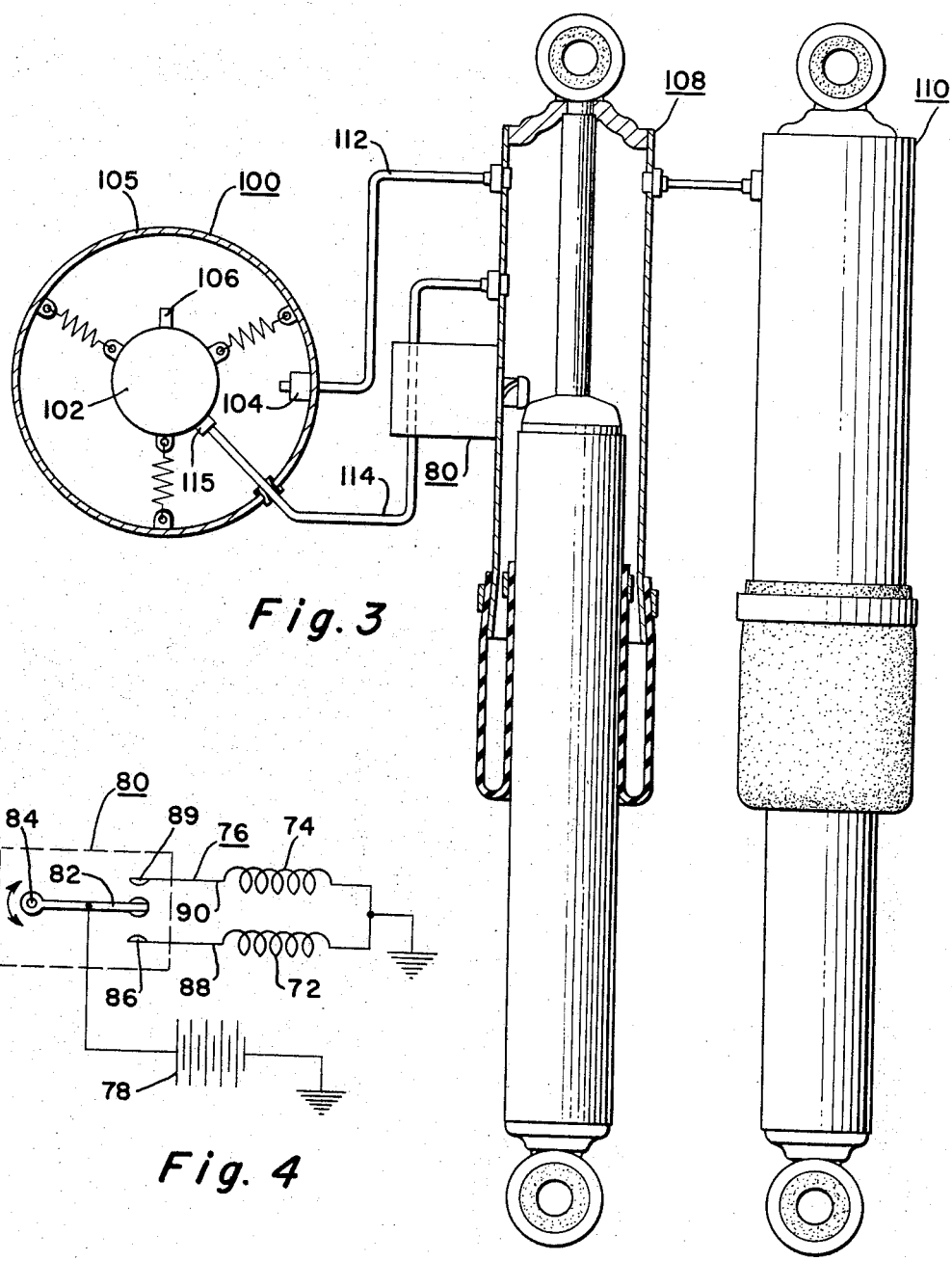

3,339,910
AUTOMATIC LEVELING SYSTEM
George W. Jackson, Dayton, Ohio, assignor to General Motors Corporation, Detroit, Mich., a corporation of Delaware
Continuation of application Ser. No. 414,740, Nov. 30, 1964. This application Aug. 22, 1966, Ser. No. 574,254
9 Claims. (Cl. 267—65)

This application is a continuation of Ser. No. 414,740, filed on Nov. 30, 1964, now abandoned.

This invention relates to systems for automatically maintaining a predetermined height relationship between a sprung and an unsprung mass and, more particularly, to such systems that include a combination shock absorber and an air booster spring pressurizable by a suitable fluid such as air.

One problem in many spring suspension system that support the body of a motor vehicle with respect to its axle and ground engaging wheels is that as the load distribution in the body changes, the height relationship between the body and axle and road engaging wheel structure moves from a preselected desired height relationship. In such a case, the shock absorber units supported between the sprung and unsprung masses for damping the movements thereof have a reduced effectiveness as a vehicle movement damping device; furthermore, such a change from the desired height relationship adversely affects the general riding qualities of the vehicle.

An object of the present invention, therefore, is to automatically maintain a desired height relationship between the sprung body and the unsprung frame axle wheel assembly of a vehicle by means of a combination shock absorber and air spring unit having an improved closed fluid system associated therewith for selectively directing pressurized fluid to and from the air spring in response to changes in the weight of the sprung mass for causing the shock absorber unit in combination with a primary spring suspension system to maintain the sprung mass at a desired predetermined height relationship with the unsprung mass.

A further object of the present invention is to automatically maintain a desired height relationship between a sprung and an unsprung mass by the provision of a combination shock absorber and air spring unit adapted to be located between the sprung and unsprung mass for damping the road induced relative movements therebetween wherein the air spring is associated with an improved closed fluid pressure system including a hermetically sealed compressor and fluid control valve selectively operable by means responsive to changes in the weight of the sprung mass to cause the air spring to be selectively inflated and deflated to maintain the desired height relationship.

A still further object of the present invention is to automatically maintain a desired height relationship between a sprung and an unsprung mass by the provision of a combination shock absorber and air spring unit and a closed fluid system for supplying pressurized fluid to and from the air spring including an electric motor driven compressor for pressurizing fluid and an electrically energizable solenoid valve for controlling fluid flow and switch means for selectively connecting the compressor motor solenoid valve to a source of power in response to changes in the weight of the sprung mass; and to provide such a system wherein the compressor and solenoid valve are included in a hermetically sealed tank constituting a portion of the closed fluid system.

Further objects and advantages of the present invention will be apparent from the following description, reference being had to the accompanying drawings wherein a preferred embodiment of the present invention is clearly shown.

In the drawings:

FIGURE 1 is a schematic view of an automatic leveling system including the present invention;

FIGURE 2 is an enlarged, fragmentary, sectional view of an electrical switch actuator in FIGURE 1;

FIGURE 3 is a schematic view of a modification of the system of FIGURE 1; and

FIGURE 4 is a diagrammatic view of an electrical circuit for controlling the operation of the system shown in FIGURE 1.

Referring now to the drawings, in FIGURE 1, an improved automatic leveling system 10 is illustrated including a pair of combination shock absorber and air spring units 12, 14. Each of the units are of the type more particularly set forth in United States Patent No. 3,063,701, issued Nov. 13, 1962, to Paul J. Long, Jr., for Shock Absorber With Air Booster Spring.

As explained more fully in the Long patent, such units are connected between the sprung and unsprung masses of a vehicle for damping the relative movements between the sprung and unsprung masses produced by normal road movements and for supplementing the load carrying action of a primary suspension system between the sprung and unsprung masses to maintain a desired height relationship therebetween.

For example, automobile bodies are preferably maintained at a predetermined design height at all times whether the car is unloaded or fully loaded. At such a design height, the automobile is suspended so that the headlights are accurately aimed on the road and the sprung mass is sufficiently elevated to prevent bottoming against frame stops or scraping thereof on steep inclines. Additionally, at such a design height steering control is more responsive and positive.

For purposes of understanding the present invention, it should be pointed out that each of the combination units 12, 14 includes a shock absorber unit 16 having a cylindrical outer surface 18 closed by an end closure member 20 at one end thereof and by an end closure member 22 at the opposite end thereof. On the closure member 20 is secured a bearing mount 24 adapted to be connected to the unsprung mass of a vehicle and at the opposite end of the shock absorber 16 a reciprocal piston rod 26 is directed through the end cap 22 exteriorly thereof where its outer end is secured to an upper bearing mount 28 adapted to be secured to the sprung mass.

Carried on the reciprocal piston rod 26 is a tubular, rigid, elongated member 30 having an upper open end thereof closed by a top wall 32 that is fixed to the piston rod 26 for movement therewith by fitting in a reduced diameter portion 34 of the rod. The member 30 is arranged concentrically of the outer cylindrical surface 18 of shock absorber unit 16 in spaced telescoping relationship therewith wherein a space 35 is formed between it and the outer surface 18. The opposite opened end of the member 30 is closed by a flexible sleeve 36 of resilient material having one end 37 thereof surrounding the open end of the member 30 in continuous engagement therewith and being fastened into a sealing relationship thereon by a clamp ring 38. The sleeve 36 is rolled inwardly of end 37 to form a return bend portion 40 that connects the end 37 to an inwardly located tubular sleeve extension 42 that is supported by the outer shock absorber surface 18 and secured at the end thereof in sealing engagement with the outer surface 18 by a clamp ring 44. The sleeve 36, member 30 and shock absorber 16 thereby in combination close the space 35 against fluid leakage exteriorly thereof. In the illustrated arrangement the tubular member 30 of unit 14 has a fluid inlet fitting 46 directed therethrough and an outlet fitting 48 for directing fluid from the space 35 exteriorly of the combination unit. The system also includes a conduit 49 connected to each of the units 12, 14 for intercommunicating the spaces 35 therein.

The fluid fittings 46, 48 are in communication with a closed pressure system 50 that is schematically illustrated as including an electrical motor driven compressor 52 supported within a pressure enclosure or shell 54 by a plurality of mounting springs 56, 58, 60 representatively illustrated as being tension springs having the opposite ends thereof secured to spaced points on the inner surface of the enclosure 54 and the outer shell of the compressor 52. The enclosure 54 hermetically seals the compressor 52 and in the embodiment of the invention illustrated in FIGURE 1, the compressor 52 is shown to have an inlet 51 and an outlet 53 thereof connected to a conduit 62 directed through a sealing grommet 64 in the shell 54 exteriorly thereof where it is connected to the inlet fitting 46.

The system 10 further includes a conduit 65 connected to the outlet fitting 48 and to a solenoid actuated exhaust valve assembly 66 supported interiorly of the shell 54 and including an outlet 70 for directing air exhausted from the pressurizable spaces 35 into the shell 54.

The shell 54 serves as a low-pressure reservoir in the closed system of FIGURE 1 for hermetically sealing the compressor 52 from dirt, moisture and the like in the surrounding atmosphere. Additionally, the shell serves as a means for isolating the noise of compressor operation.

The compressor 52 is driven by an electrical drive motor 72 associated therewith and the exhaust valve 66 includes an electrically energizable solenoid coil 74 shown in FIGURE 4 in an electrical control circuit 76 that is connected to a power source, for example, a battery 78 by a height control switch 80, that is carried on the tubular member 30 of the superlift unit. The switch 80 is a single-pole, double-throw switch having a movable contact carrying member 82 which is selectively positioned by a movable actuator means 84 associated with the sprung mass. The member 82 is positioned by relative movement between the sprung and the unsprung masses to selectively engage a fixed contact 86 to complete a motor energization circuit 88 or a fixed contact 89 to complete a solenoid coil energization circuit 90.

In the structural views of FIGURES 1 and 2 the switch 80 is shown as having an outer housing 92 thereof secured to the outside of tubular member 30 where a screw 94 directed outwardly of housing 92 into space 35 is fastened to the actuator means 84 at one end thereof and has a head 95 thereon biased by a spring 96 against shock absorber 16. Movement of member 30 causes reciprocation of screw 94 which is then rotated upon engaging pins 97 fixed in a rigid part of the switch 80 to thereby cause actuator means 84 to open and close the switch 80.

A representative single-pole, double-throw switch is more specifically set forth in United States Patent No. 2,921,160, issued Jan. 12, 1960, to Lautzenhiser, for Electric Switch. The switch is of the damped type wherein high-frequency road movements do not move the movable member 82. The member is moved into its respective switching positions by changes in the weight of the sprung mass that cause a relative movement between the bearing mounts 24, 28 on the ends of the combination shock absorber and air spring unit.

Thus, in operation, assuming that the sprung and unsprung masses are at a desired height relationship, the movable member 82 is positioned intermediate the contacts 86, 89 whereby the system is deenergized.

Upon an increase in load that causes the primary suspension spring to compress so that the ends of the shock absorber are moved closer together from the desired predetermined height relationship, the movable switch member 82 is eventually moved into engagement with the contact 86 for energizing the run winding of the compressor motor 72. Fluid is thereby drawn from the interior of shell 54 and discharged through the inlet fitting 46 into one of the pressurizable chambers 35 thence through conduit 49 into the other of the chambers 35 to cause the flexible tubular sleeves 36 to be inflated to produce a supplemental load carrying spring action that will move the sprung and unsprung masses back to their desired height relationship. When the combination units are so orientated, any unloading of the vehicle will, because of the pressure in the chambers 35, cause the shock absorbers to extend so that their ends are separated a distance in excess of the predetermined height relationship to cause the movable arm 82 to move out of engagement with the contact 86 and to move into engagement with the solenoid actuated exhaust valve contact 89 whereby the solenoid valve 66 is conditioned to exhaust fluid from chambers 35 through the conduit 65 interiorly of the shell 54.

The movable arm 82 pulsatingly controls both the solenoid exhaust valve and compressor motor to maintain the desired height relationship through a wide range of loading conditions.

In certain cases the sprung mass is overloaded so as to cause the compressor motor contacts 86 to continually engage the movable contact carrying arm 82. By virtue of the illustrated arrangement, the compressor 52 is only able to produce a predetermined maximum pressure in the pressurizable chamber 35 before it draws a vacuum in the inlet receiver formed by the shell 54. Thus, the closed system serves as a built-in safety device against overinflation.

Additionally, when the vehicle is normally loaded so that the main spring system carries the sprung and unsprung masses at a desired height relationship, the volume of the system and the amount of compressible fluid therein is such that the system will be balanced at a predetermined minimum pressure whereby the inflatable sleeve 36 is held out of engagement with itself so as to limit undesirable wear.

In FIGURE 3 a modified system 100 is illustrated which is like system 10 but with an electric motor driven compressor 102 and solenoid valve 104 hermetically sealed within a shell 105 that receives pressurized fluid from an outlet 106 of compressor 102. The valve 104 serves to direct pressurized fluid into combination units 102, 110 like units 12, 14 through a conduit 112 and a conduit 114 serves as an exhaust line that is connected to an inlet 115 of the compressor 102. By virtue of this arrangement, an instantaneous source of pressure is available in shell 105 of maintaining a desired height relationship. When valve 104 is closed, compressor operation will draw fluid from the pressurizable chambers in the combination units 108, 110 to reduce the pressure therein upon reducing the weight of a sprung mass partially supported thereby.

While the embodiment of the present invention as herein dislosed constitutes a preferred form, it is to be understood that other forms might be adopted.

What is claimed is as follows:

1. In an automatic leveling system for maintaining a predetermined height relationship between a sprung and an unsprung mass, the combination of, a shock absorber unit, fluid spring means supported on said shock absorber unit for adjusting the length of said shock absorber unit to maintain the sprung mass at a predetermined height relationship with respect to the unsprung mass, a source of pressure for inflating said fluid spring means including a compressor, means including a solenoid valve for controlling the pressure level in said fluid spring means, a source of power for driving said compressor, switch means responsive to changes in said load of the sprung mass for selectively operating said compressor and said solenoid valve to modulate the pressure in said fluid spring means to maintain the desired height relationship between the sprung and unsprung masses.

2. In an automatic leveling system for maintaining a predetermined height relationship between a sprung and an unsprung mass, the combination of, fluid spring means including a pressurizable chamber to maintain the sprung mass at a predetermined height relationship with respect to the unsprung mass, a source of pressure for inflating said fluid spring means chamber including a compressor, means for hermetically enclosing said compressor, fluid control means for selectively directly pressurized fluid between between said compressor enclosure means and said fluid spring unit, and means responsive to changes in the load of the sprung mass to selectively drive said compressor for compressing fluid and to condition said fluid control means to direct a predetermined amount of pressurized fluid between said enclosure means and fluid spring means for maintaining the desired height relationship.

3. In the combination of claim 2, said enclosure means serving as a low-pressure reservoir for directing fluid to the inlet of the compressor, said fluid control means including solenoid valve means for exhausting pressurized from said fluid spring means into said enclosure means.

4. In the combination of claim 2, said compressor having its outlet communicating with said enclosure means, said enclosure means serving as a prepressurized source of fluid for inflating said fluid spring means, said fluid control means including solenoid actuated valve means energizable to direct pressurized fluid from said enclosure means to the fluid spring means, said compressor having an inlet directly communicating with said fluid spring means whereby energization of the compressor causes the compressor to draw fluid from said fluid spring means and discharge it into said enclosure means from whence it is directed under control of said valve means.

5. In an automatic leveling system for maintaining a predetermined height relationship between a sprung and an unsprung mass, the combination of, a shock absorber having the ends thereof adapted to be connected to the sprung and unsprung masses respectively, fluid spring means supported by said shock absorber for maintaining a predetermined distance between the ends thereof to maintain the desired height relationship, means for pressurizing said fluid spring means including an electric compressor drive motor, a source of power, height control switch means supported on said shock absorber including means actuatable upon a predetermined relative movement between the sprung and unsprung masses for selectively connecting the compressor motor to the source of power for effecting a predetermined pressurization of said air spring means, said pressurization means including a solenoid valve for controlling the pressure level in said fluid spring means, said height control switch sensing the load of the sprung mass for selectively operating said compressor motor and said solenoid valve to modulate the pressure in said fluid spring means to maintain the desired height relationship.

6. In an automatic leveling system for maintaining a predetermined height relationship between a sprung and an unsprung mass, the combination of, a shock absorber having the ends thereof adapted to be connected to the sprung and unsprung masses, a fluid spring unit supported by said shock absorber including an expansible pressurizable chamber for moving the ends of the shock absorber relative to one another to maintain a predetermined desired height relationship between the sprung and unsprung masses, a motor driven compressor, an enclosure for hermetically sealing the compressor, means for resiliently supporting the compressor within the sealed enclosure, means for directing pressurized fluid from the compressor into the expansible pressurizable chamber of said air spring unit, a source of power, a height control electrical switch means, coacting means on said shock absorber and fluid spring unit for conditioning said switch means upon a first predetermined height relationship between said sprung and unsprung masses for connecting the compressor drive motor to the source of power, exhaust valve means for deflating said fluid spring unit, and said coacting means conditioning said height control switch on a second predetermined height relationship between the sprung and unsprung masses to de-energize the compressor motor and energize the exhaust valve means so as to maintain the desired predetermined height relationship.

7. In an automatic leveling system for maintaining a predetermined height relationship between a sprung and an unsprung mass, the combination of, a shock absorber having the ends thereof adapted to be connected to the sprung and unsprung masses, fluid spring means supported by said shock absorber including an expansible pressurizable chamber for moving the ends of the shock absorber relative to one another to maintain the predetermined desired height relationship between the sprung and unsprung masses, a source of pressure including a motor driven compressor, an enclosure for hermetically sealing said compressor, fluid control means for selectively directing pressurized fluid between said compressor enclosure and the expansible pressurizable chamber of said fluid spring means, a source of power, a height control electrical switch means, coacting means on said shock absorber and fluid spring means for conditioning said switch means upon a first predetermined height relationship between said sprung and unsprung masses for connecting said motor driven compressor to the source of power, said coacting means conditioning said height control switch upon a second predetermined height relationship between the sprung and unsprung masses to de-energize said motor driven compressor and condition said fluid control means to deflate said fluid spring means so as to maintain the desired predetermined height relationship.

8. In the combination of claim 7, said enclosure serving as the low-pressure reservoir for directing fluid to the inlet of the compressor, said fluid control means including solenoid valve means for exhausting pressurized fluid from said fluid spring means into said enclosure.

9. In the combination of claim 7, said compressor having its outlet communicating with the interior of said enclosure, said enclosure serving as a prepressurized source of fluid for inflating said fluid spring means, said fluid control means including solenoid actuated valve means energizable to direct pressurized fluid from said enclosure to said fluid spring means, conduit means for communicating said fluid spring means directly with the inlet of said compressor whereby energization of the compressor causes the compressor to draw fluid from said fluid spring means and discharge it into said enclosure.

References Cited

UNITED STATES PATENTS

| | | | |
|---|---|---|---|
| 2,536,626 | 1/1951 | Coleman | 267—64 |
| 3,026,103 | 3/1962 | Gates | 267—65 |
| 3,120,962 | 2/1964 | Long | 267—64 |
| 3,173,671 | 3/1965 | Broodwell | 267—64 |

ARTHUR L. LA POINT, *Primary Examiner.*

R. M. WOHLFARTH, *Assistant Examiner.*

UNITED STATES PATENT OFFICE
CERTIFICATE OF CORRECTION

Patent No. 3,339,910 September 5, 1967

George W. Jackson

It is hereby certified that error appears in the above numbered patent requiring correction and that the said Letters Patent should read as corrected below.

In the heading to the printed specification, line 6 and column 1, line 10, for "414,740", each occurrence, read -- 414,746 --; line 18, for "system" read -- systems --; column 4, line 47, for "102" read -- 108 --; line 51, for "of" read -- for --; line 73, for "said" read -- the --; column 5, line 11, for "directly" read -- directing --.

Signed and sealed this 12th day of November 1968.

(SEAL)
Attest:

Edward M. Fletcher, Jr.
Attesting Officer

EDWARD J. BRENNER
Commissioner of Patents